US012570354B2

(12) United States Patent
Kogan

(10) Patent No.: US 12,570,354 B2
(45) Date of Patent: Mar. 10, 2026

(54) STEERING GEAR FOR A VEHICLE, MORE PARTICULARLY A UTILITY VEHICLE

(71) Applicant: KNORR-BREMSE Systeme fuer Nutzfahrzeuge GmbH, Munich (DE)

(72) Inventor: Alexander Kogan, Cologne (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 476 days.

(21) Appl. No.: 18/022,032

(22) PCT Filed: Aug. 12, 2021

(86) PCT No.: PCT/EP2021/072551
§ 371 (c)(1),
(2) Date: Feb. 17, 2023

(87) PCT Pub. No.: WO2022/038045
PCT Pub. Date: Feb. 24, 2022

(65) Prior Publication Data
US 2023/0347969 A1 Nov. 2, 2023

(30) Foreign Application Priority Data

Aug. 19, 2020 (DE) ..................... 10 2020 121 808.7

(51) Int. Cl.
*B62D 3/08* (2006.01)
*F16H 25/20* (2006.01)
(Continued)

(52) U.S. Cl.
CPC ........... *B62D 3/08* (2013.01); *F16H 25/2204* (2013.01); *F16H 25/24* (2013.01); *F16H 2025/209* (2013.01)

(58) Field of Classification Search
CPC ....... B62D 3/08; F16H 25/2204; F16H 25/24; F16H 2025/209
See application file for complete search history.

(56) References Cited

U.S. PATENT DOCUMENTS

| | | | |
|---|---|---|---|
| 2,664,760 A | 1/1954 | Booth | |
| 2,826,932 A | 3/1958 | Schulze | |

(Continued)

FOREIGN PATENT DOCUMENTS

| | | | |
|---|---|---|---|
| CN | 203318492 U | * | 12/2013 |
| CN | 203739970 U | * | 7/2014 |

(Continued)

OTHER PUBLICATIONS

Japanese-language Office Action issued in Japanese Application No. 2023-512153 dated Dec. 12, 2023 with English translation (13 pages).

(Continued)

*Primary Examiner* — Faye M Fleming
(74) *Attorney, Agent, or Firm* — Crowell & Moring LLP

(57) ABSTRACT
A recirculating ball steering gear for a steering system of a vehicle, in particular a utility vehicle, includes at least one housing, at least one steering spindle, at least one steering spindle nut which is guided in an axially displaceable manner inside the housing and which in the assembled state is connected to the steering spindle via a plurality of balls, and at least one bearing device, by which the steering spindle is supported in the housing. The bearing device, the steering spindle and the housing form an adjusted bearing arrangement.

11 Claims, 1 Drawing Sheet

(51) Int. Cl.
    *F16H 25/22*       (2006.01)
    *F16H 25/24*       (2006.01)

(56)           References Cited

U.S. PATENT DOCUMENTS

| | | | |
|---|---|---|---|
| 2,916,945 A | 12/1959 | Rittenhouse et al. | |
| 3,498,153 A * | 3/1970 | Heinrich | B62D 3/08 |
| | | | 74/499 |
| 9,731,753 B2 | 8/2017 | Haegele et al. | |
| 2002/0148672 A1 | 10/2002 | Tatewaki et al. | |
| 2004/0141674 A1 | 7/2004 | Leimann | |
| 2014/0345966 A1 | 11/2014 | Asakura et al. | |
| 2021/0403077 A1 | 12/2021 | Kogan et al. | |

FOREIGN PATENT DOCUMENTS

| | | | | | |
|---|---|---|---|---|---|
| CN | 118144865 A * | 6/2024 | | | B62D 3/08 |
| DE | 37 14 833 A1 | 11/1987 | | | |
| DE | 602 23 853 T2 | 10/2008 | | | |
| DE | 103 51 618 B4 | 6/2011 | | | |
| DE | 10 2014 107 116 A1 | 11/2014 | | | |
| DE | 10 2018 127 204 A1 | 4/2020 | | | |
| EP | 3 192 719 A1 | 7/2017 | | | |
| GB | 2 199 621 A | 7/1988 | | | |
| JP | 51-12044 A | 1/1976 | | | |
| JP | 54-29170 A | 3/1979 | | | |
| JP | 63-172010 A | 7/1988 | | | |
| JP | 2004-526107 A | 8/2004 | | | |
| WO | WO 2013/058752 A1 | 4/2013 | | | |

OTHER PUBLICATIONS

Chinese-language Office Action issued in Chinese Application No. 202180055643.4 dated Jan. 27, 2025 with English translation (13 pages).

Japanese-language Office Action issued in Japanese Application No. 2023-512153 dated Jun. 18, 2024 with English translation (9 pages).

International Search Report (PCT/ISA/210) issued in PCT Application No. PCT/EP2021/072551 dated Dec. 10, 2021 with English translation (five (5) pages).

German-language Written Opinion (PCT/ISA/237) issued in PCT Application No. PCT/EP2021/072551 dated Dec. 10, 2021 (six (6) pages).

German-language Office Action issued in German Application No. 10 2020 121 808.7 dated Apr. 16, 2021 (five (5) pages).

\* cited by examiner

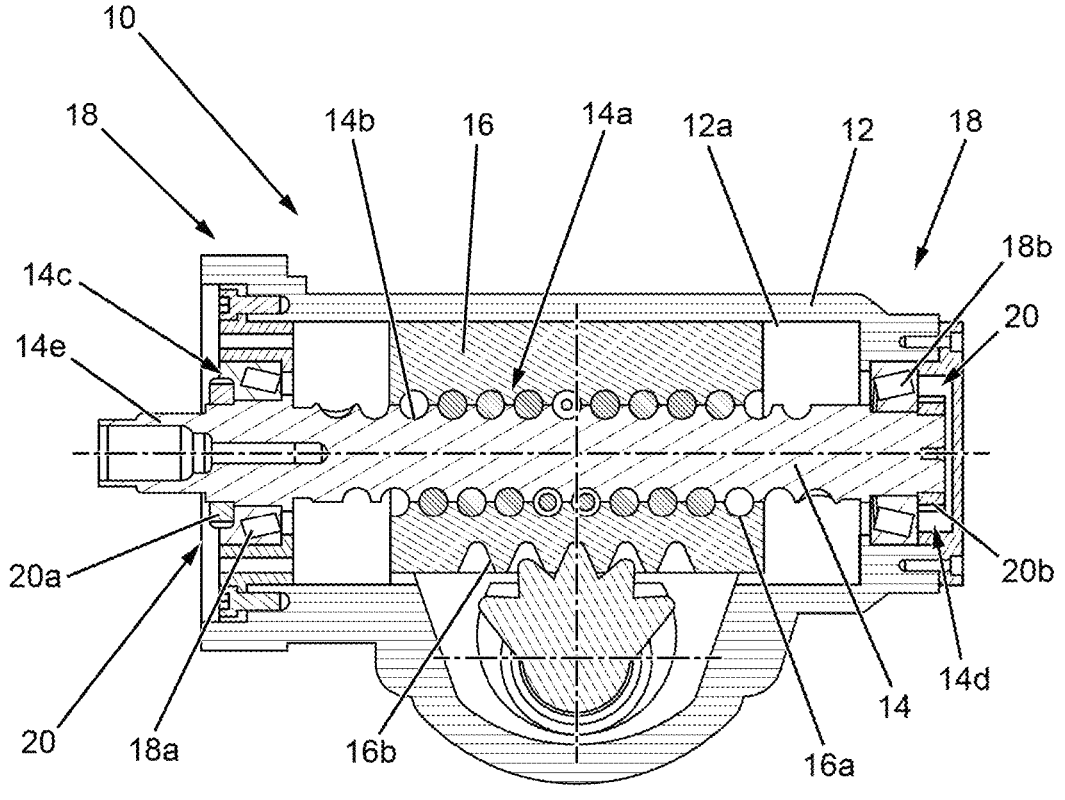

STEERING GEAR FOR A VEHICLE, MORE PARTICULARLY A UTILITY VEHICLE

BACKGROUND AND SUMMARY

The present invention relates to a recirculating ball steering gear for a steering system of a vehicle, in particular of a utility vehicle, having at least one housing; having at least one steering spindle; having at least one steering spindle nut which is guided in an axially displaceable manner inside the housing and which in the assembled state is connected to the steering spindle via a plurality of balls; and having at least one bearing device.

Current steering gears for utility vehicles or for heavy goods vehicles are often configured as recirculating ball steering gears. This construction type affords the advantage, with particularly great axle loads with heavy utility vehicles, of a great steering force or steering torque support with a basic principle for construction which is simple at the same time.

Such recirculating ball steering gears are already known from the prior art.

Thus, DE 3714833 A1 sets out an auxiliary power-assisted steering system comprising a first power amplification device which has a working piston which is fitted in a basic housing of the steering gear and which is engaged with a threaded spindle. The working piston drives a steering shaft which carries a steering segment via a tooth arrangement. An electric motor which drives a shaft extension via a step-down gear and a switchable clutch is provided as the second force amplification device. The shaft extension is connected to the threaded spindle in a rotationally secure manner. The second force amplification device is received in a housing which is flange-mounted on the basic housing.

Furthermore, EP 3192719 A1 discloses an electric power-assisted steering apparatus comprising a housing, a rotating shaft for the steering system, a worm gear, a worm shaft, a lateral toe bearing, an electric motor and a pretensioning mechanism. The pretensioning mechanism comprises a wedge piece and a resilient element for a wedge piece. The wedge piece is arranged between an external circumferential face of the lateral toe bearing and an internal circumferential face of the housing in a state, in which the wedge piece can be displaced in a circumferential direction. The resilient member for a wedge piece applies a resilient force to the wedge piece in the direction of a circumferential side.

Furthermore, U.S. Pat. No. 9,731,753 B2 sets out a steering gear component for a vehicle, comprising a worm which is supported in a rotatable and axially non-displaceable manner, wherein the worm has a ball screw for receiving a ball row and a ball nut which is connected in terms of drive to the worm via the ball row, and wherein the ball nut acts as a piston of a cylinder for supporting the steering force, wherein a signal transmitter for a sensor element is arranged on the steering spindle and the sensor element is arranged on the worm, or wherein the sensor element is arranged on the steering spindle and the signal transmitter for the sensor element is arranged on the worm.

Furthermore, WO 2013058752 A1 discloses a power-assisted steering system for the multiple-axle steering of a motor vehicle, comprising a primary steering gear, which is controlled by the steering wheel which comprises a piston which is fixed to a steerable wheel on a first axle of the motor vehicle, a second steering gear which is fixed to a steerable wheel on a second axle of the motor vehicle, and a gear mechanism arrangement which connects the first power-assisted steering gear and the second power-assisted steering gear to each other. The primary steering gear contains a fluid control valve having an output element which is connected to the piston and which is connected to the gear arrangement.

DE 10351618 B4 further discloses a utility vehicle steering system having a steering gear which transmits steering movements, which are introduced at the gear input, via a shaft which is rotatably supported in the gear housing and a piston which is movable along the shaft by the shaft rotation to a steering lever, and having a hydraulic auxiliary power amplification device which supports the piston movement by controlled pressure application with a hydraulic fluid, wherein an additional auxiliary power amplification device which has an electric motor, the torque of which is transmitted via a gear mechanism which steps down, to the shaft is provided.

The central part of such a recirculating ball steering gear is a ball screw having ball screw nuts which are connected thereto and the recirculating ball system which connects the two components. However, this subassembly is subjected to powerful wear because it moves during operation into complex three-dimensional tension states, particularly in the steering spindle. This is particularly the case when the ball screw nut rotates a segmented shaft which meshes therewith and is subjected to a radial force component which leads to bending of the steering spindle as a result of the tapping thereof. This is particularly the case when the steering support energy is provided via a power-assisted gear stage and an electric motor for the ball screw.

The bending of the steering spindle in turn leads to partially increased pressure forces on individual ball rows of the recirculating ball system. They can exceed the permissible surface pressure of the recirculating ball system in some points and thus cause damage to balls and race tracks of ball screws or steering spindles and ball screw nuts.

Therefore, an object of the present invention is to develop a steering gear of the type mentioned in the introduction in an advantageous manner, particularly in that the wear of the steering gear is minimized and the structural space thereof is optimized.

This object is achieved according to the invention by a steering gear having the features of the independent claim. Accordingly, there is provision for a recirculating ball steering gear for a steering system of a vehicle, in particular a utility vehicle, having at least one housing; having at least one steering spindle; having at least one steering spindle nut which is guided in an axially displaceable manner inside the housing and which in the assembled state is connected to the steering spindle via a plurality of balls; and having at least one bearing device, by which the steering spindle is supported in the housing; wherein the bearing device, the steering spindle and the housing form an adjusted bearing arrangement.

The invention is based on the basic notion that, as a result of the adjusted bearing arrangement, the steering spindle can be pretensioned by means of the bearing device with respect to at least the housing, which is not possible with a fixed/movable bearing which is conventional in the prior art. As a result of the pretensioning of the steering spindle, the bending thereof which is produced particularly by radial force components of the segmented shaft tap is reduced. This reduction further results in a more uniform contact pattern of the balls or the recirculating ball system so that a partial or point-like overloading can be more effectively avoided. Furthermore, as a result of the present invention, account is also taken of the trend toward a purely electromechanical steering system because the steering spindle will be subjected to increased wear in future by the hydraulic steering support being dispensed with in relation to necessary component dimensions for the power transmission within the steering gear in a manner ensuring the service-life of the product. In order to ensure the service-life expectations, for a purely electromechanical application, an increase of the spindle diameter and an increase in the number of recirculating ball systems, which consequently involve problems in terms of structural space, are necessary. In this regard, the pretensioning of the steering spindle can act counter to both these problems in terms of structural space and an increased wear and can thus provide optimization of the steering gear in this regard. In the context of the invention, however, it is nevertheless also possible to provide the steering gear according to the invention additionally or alternatively as an electromechanical/hydraulic configuration in addition to a purely electromechanical configuration.

The adjusted bearing arrangement particularly brings about a pretensioning of the spindle.

In an advantageous embodiment, the bearing device, the steering spindle and the housing form an adjusted bearing arrangement so that the steering spindle is pretensioned. As a result of the pretensioning, it becomes possible for the diameter of the spindle to be able to be reduced. Therefore, there can be brought about, as a result of the pretensioning, a diameter reduction by which the overall dimensions or the structural space requirement of the entire subassembly, which comprises at least the bearing device, steering spindle and housing, can also be reduced.

Furthermore, there may be provision for the bearing device to have at least one pretensioning device, by which the steering spindle can be pretensioned in an axial and/or radially adjustable manner. This pretensioning device allows a precise and defined adjustment of the pretensioning of the steering spindle, which is particularly important because the pretensioning is intended to be kept within tight limits. If the pretensioning is selected to be too large, it would have a disadvantageous effect on the ball wear or recirculating ball system wear of the steering spindle and recirculating ball nut. If, however, the pretensioning should be selected to be too small, an excessively great bending would still be produced as a result of the tapping of the recirculating ball nut on the segmented shaft, which would again have a negative effect on the wear of these components.

It is further contemplated for the bearing device to have at least a first bearing unit and at least a second bearing unit. The subdivision of the bearing device into at least a first and second bearing unit is advantageous because the pretensioning is thus adjustable even more precisely. Furthermore, the loads, tensions and the wear acting on the steering spindle and recirculating ball nut can be further optimized by suitable arrangements and configuration of the bearing units.

It is further contemplated that, in the assembled state, the first bearing unit is arranged in the region of a first end of the steering spindle and the second bearing unit is arranged in the region of a second end of the steering spindle. This arrangement of the two bearing units ensures a configuration, which is stiffer particularly in the radial direction, of the bearing device. This is because, with increasing axial spacing relative to each other, the axial support path can be increased (at least within reasonable limits) and thus the forces and particularly torques which act on the steering spindle and recirculating ball nut can be effectively counteracted. Furthermore, the arrangement at the two end regions of the steering spindle with regard to the capacity for assembly and accessibility is advantageous because they are simplified.

It is further possible for the pretensioning device to have at least a first pretensioning element which is arranged in the assembled state in the region of the first end of the steering spindle or in the region of the second end of the steering spindle. In addition to the improved capacity for assembly of the bearing units and pretensioning units as a result of the arrangement thereof at the two end regions, the accessibility and adjustability of the pretensioning units are simplified and are further possible more precisely. As a result, the pretensioning of the steering spindle can be adjusted even more precisely and more selectively, whereby the wear of the recirculating ball system, the recirculating ball nut and the steering spindle can be further reduced, which results in a higher service-life and improved functional reliability of the steering gear.

Furthermore, there may be provision for the pretensioning device to have at least a second pretensioning element which is arranged in the assembled state in the region of the second end of the steering spindle, wherein the first pretensioning element is arranged in the region of the first end of the steering spindle. By providing two pretensioning elements at the two end regions of the steering spindle, a pretensioning of the steering spindle in an axially and radially excessively unilateral manner is prevented. Therefore, the pretensioning of the steering spindle can be carried out substantially symmetrically if the spacing of both bearing units and pretensioning elements from the axial center of the steering spindle is selected to be substantially identical. This configuration reduces the occurrence of tensions and loads within the recirculating ball system, the recirculating ball nut and the steering spindle so that the wear thereof can further be effectively reduced.

It is also contemplated for the first bearing unit to have at least a first tapered roller bearing and for the second bearing unit to have at least a second tapered roller bearing. Tapered roller bearings are already known from the prior art as tried-and-tested and reliable machine elements and are particularly highly suitable in adjusted bearing arrangements and pretensioned bearings because the force absorption or load-bearing capacity thereof in a radial and axial direction is high and they simultaneously allow a very simple, precise and reliable adjustment of the positioning and the pretensioning of the entire bearing. Furthermore, as a result of the adjustment of the two tapered roller bearings, the bearing overall can be stiffened so that in particular the steering spindle under load (that is to say, during dynamic engagement with the segmented shaft) bends even less, which affords the above-described advantages with regard to wear, safety and service-life. In order to increase the stiffness of the bearing overall and/or the first and/or second bearing unit, the first bearing unit can also be constructed as a multiple-rowed, for example, two-rowed, three-rowed or four-rowed tapered roller bearing, which also applies similarly to the second bearing unit. The multiple-rowed tapered roller bearing may be constructed either from juxtaposed individual tapered roller bearings or by combined one-piece tapered roller bearings.

Furthermore, it is contemplated for the first tapered roller bearing and the second tapered roller bearing to form, in the assembled state, an O-like arrangement. The O-like arrangement increases the receivable tilting moment of the bearing as a result of the position of the pressure lines (force flow lines) through the two tapered roller bearings which are located or intersect in the O-like arrangement axially outside the first and second bearing units. The reason for the increased absorption of tilting moments is the increased spacing of the pressure centers of the pressure lines so that the stiffness of the bearing can thereby be further increased.

It is further possible for, in the assembled state, the first pretensioning element to be screwed on the steering spindle in the region of the first end of the steering spindle and to be adjusted against at least one internal ring of the first tapered roller bearing. This configuration simplifies the production of the steering gear because no additional thread has to be introduced into the bearing receiving hole of the housing in order to receive the first pretensioning element. Furthermore, the pretensioning element can be configured to be smaller and thereby more advantageous and can further be mounted more easily.

There may additionally be provision for, in the assembled state, the second pretensioning element to be screwed on the steering spindle in the region of the second end of the steering spindle and to be adjusted against at least one internal ring of the second tapered roller bearing. This arrangement affords the same advantages as already discussed above in connection with the first pretensioning element. Furthermore, by the two pretensioning elements cooperating with respect to the steering spindle, the pretensioning of the steering spindle can be adjusted in a particularly precise, symmetrical and accurate manner because both pretensioning elements act directly on the steering spindle or are screwed on it.

It is further contemplated for, in the assembled and adjusted state of the first and second pretensioning elements, the pretensioning of the steering spindle to be at least in the form of a tensile pretensioning. The tensile pretensioning has the advantage that it initially acts counter to the resilient bending of the steering spindle in the non-loaded state so that this bending, on the one hand, can be reduced. On the other hand, the segmented shaft engages at the location of the greatest bending of the steering spindle so that the deformation potential is in any case greatest as a result of this configuration. If the shaft is now pretensioned for tension, consequently, initially the resilient bending of the steering spindle can be reduced in the non-loaded state. Consequently, the deformation potential is reduced in a first step because the resilient deformation in the non-loaded state can substantially no longer cooperate with the deformation under load. In this regard, the steering spindle also becomes deformed under load substantially less because the resilient deformation portion has been substantially eliminated by the tensile pretensioning. Consequently, a reduced resilient deformation of the steering spindle is produced by the tensile pretensioning both in the unloaded and in the loaded state of the steering gear, whereby the wear of the recirculating ball system and the recirculating ball nut is further decreased.

It is also contemplated for the first pretensioning element to be in the form of a slotted nut, and wherein the second pretensioning element is in the form of a slotted nut. Slotted nuts are machine elements which are robust, non-releasable and have been found to be advantageous and well-developed and which allow a very precise pretensioning as a result of a correspondingly defined tightening torque.

Additional details and advantages of the invention are now intended to be explained in greater detail with reference to one embodiment which is illustrated in the single drawing.

BRIEF DESCRIPTION OF THE DRAWING

FIG. 1 is a schematic cross section of an embodiment of a steering gear according to the invention.

DETAILED DESCRIPTION OF THE DRAWING

The steering gear 10 is in the form of a recirculating ball steering gear 10 for a steering system of a utility vehicle (not shown in FIG. 1).

The steering gear 10 has a housing 12, a steering spindle 14 and a steering spindle nut 16 which is guided inside the housing in an axially displaceable manner.

In this case, the steering spindle nut 16 is guided in a round guide hole 12a of the housing 12 in an axially displaceable manner.

The guide hole 12a can particularly have a circular cross section and the guide surface of the steering spindle nut 16 can be in contact with the guide hole 12a completely circumferentially or partially circumferentially.

The steering spindle nut 16 is further connected to the steering spindle 14 in the assembled state via a plurality of balls or a recirculating ball system 14a.

In this case, the recirculating ball system 14a is intended to be understood so that it has a plurality of helical recirculating systems for balls 14a in an axial direction, as can be seen in FIG. 1.

The balls 14a are consequently guided in an axially extending helical or screw-like spindle groove 14b of the steering spindle, wherein the spindle groove 14b has a semicircular cross section.

Accordingly, the balls or the recirculating ball system 14a cooperate with an additional, corresponding, axially extending helical or screw-like slotted nut 16a/steering spindle nut 16, wherein the slotted nut 16a also has a semicircular cross section.

According to FIG. 1, a rotational movement of the steering spindle 14 is transmitted via the plurality of balls or the recirculating ball system 14a to the steering spindle nut 16, which results in the axial displacement movement of the steering spindle nut 16 inside the housing 14.

On a partial region of the covering face thereof, the steering spindle nut 16 further has a partial tooth arrangement 16b which in the assembled state is engaged with a segmented toothed wheel of a segmented shaft.

The steering gear 10 further comprises according to FIG. 1 a bearing device 18, by which the steering spindle 14 is supported in the housing 12.

The bearing device 18, the steering spindle 14 and the housing 12 form an adjusted bearing arrangement in this case.

The bearing device 18 further has a pretensioning device 20, by which the steering spindle 14 can be pretensioned in an axially adjustable manner.

Additionally or alternatively, it is contemplated that the steering spindle 14 can accordingly be pretensioned in a radial and adjustable manner by the pretensioning device 20.

The bearing device 18 further has a first bearing unit 18a and a second bearing unit 18b.

The first bearing unit 18a is arranged in the assembled state in the region of a first end 14c of the steering spindle 14.

Accordingly, the second bearing unit 18b is arranged in the region of a second end 14d of the steering spindle 14.

To this end, the steering spindle 14 has at the respective region or portion of the first and second end 14c, 14d thereof, a bearing seat for receiving the first and second bearing unit 18a, 18b, respectively.

The first end of the steering spindle 14 is further connected integrally to a steering engagement member 14e which can be connected to a steering column (not shown in FIG. 1) and a steering wheel.

The above-described pretensioning device 20 further comprises a first pretensioning element 20a which in the assembled state is arranged in the region of the first end 14c of the steering spindle 14.

Accordingly, the pretensioning device 20 has a second pretensioning element 20b which is in turn arranged in the assembled state in the region of the second end 14d of the steering spindle 14.

Alternatively to the first and second pretensioning element 20a, 20b, the pretensioning device 20 may have only one pretensioning element 20a, 20b which is then arranged in the region of the first or second end 14c, 14d of the steering spindle 14.

The pretensioning of the steering spindle 14 is then carried out via a corresponding shoulder (not shown in FIG. 1) of the steering spindle 14 which is arranged in the first region or second region of the opposite end 14c, 14d of the steering spindle 14, at which end the single pretensioning element 20a, 20b is not arranged.

According to FIG. 1, the first bearing unit 18a has a first tapered roller bearing, whereas the second bearing unit 18b accordingly has a second tapered roller bearing.

As can be seen in FIG. 1, the first tapered roller bearing and the second tapered roller bearing form an O-like arrangement in the assembled state.

The two tapered roller bearings are in the form of a single-rowed tapered roller bearing, wherein it is also contemplated for them to be able to be in the form of multiple-rowed tapered roller bearings either in a state individually juxtaposed beside each other or integrally.

In particular, two-rowed or four-rowed tapered roller bearings are contemplated in this context.

In the case of multiple-rowed tapered roller bearings, they can each be configured in an X-like, O-like or tandem arrangement.

As can further be seen in FIG. 1, in the assembled state the first pretensioning element 20a is screwed on the steering spindle in the region of the first end 14c of the steering spindle 14 and is adjusted against an internal ring of the first tapered roller bearing.

Accordingly, in the assembled state the second pretensioning element 20b is further screwed on the steering spindle 14 in the region of the second end 14d of the steering spindle 14 and adjusted against an internal ring of the second tapered roller bearing.

The first bearing unit 18a and the second bearing unit 18b are consequently constructed or arranged symmetrically with respect to an axial center axis and have the same components.

The first and second pretensioning elements 20a, 20b are in the form of slotted nuts.

As a result of the adjustment of the two slotted nuts against the two internal rings of the respective tapered roller bearings, therefore, in the assembled and adjusted state of these two pretensioning elements the pretensioning of the steering spindle 14 is in the form of a tensile pretensioning.

The two slotted nuts are further each secured by a securing plate so as to prevent undesirable release, wherein the securing plates are not illustrated in FIG. 1.

Furthermore, in the assembled state an external ring of the first tapered roller bearing is adjusted in the region of the first end 14c of the steering spindle 14 against a first housing shoulder of the housing 12 or a first housing cover.

Consequently, an external ring of the second tapered roller bearing is adjusted in the region of the second end 14d of the steering spindle 14 against a second housing shoulder of the housing 12 or a second housing cover.

As can further be seen in FIG. 1, the steering gear 10 is illustrated without any additional auxiliary drives, such as a hydraulic pump, a hydraulic piston or an electric motor for generating an additional auxiliary steering torque.

Particularly in this context, there may be provision for an electric motor or a servo motor to be flange-mounted on the steering gear 10 from FIG. 1 and for it to be connected to the steering spindle 14 in a rotationally secure manner directly via a clutch or indirectly via a step-down gear mechanism.

The electric motor could be flange-mounted on the housing 12 in such a manner that it is connected to the steering spindle 14 in the region of the first or second end 14c, 14d of the steering spindle 14.

Additionally or alternatively, there may be provision for the intermediate spaces of the round guide hole 12a of the housing 12 which are formed between the steering spindle nut 16 and the two bearing units 18a, 18b to be able to be acted on via a hydraulic pump with oil pressure.

Additionally or alternatively, a hydraulic auxiliary steering power support unit could accordingly be implemented.

However, the necessary housing lines, the hydraulic pump and the corresponding control valve for controlling the two intermediate spaces of the round guide hole 12a of the housing 12 are not illustrated in FIG. 1.

The same applies to the adaptation of the steering spindle nut 16 for sealing these two intermediate spaces relative to each other and with respect to the bearing units 18a, 18b so that the steering spindle nut 16 would then function additionally as a hydraulic piston.

The function of the steering gear 10 according to the invention can now be described as follows.

In the region of the first end 14c of the steering spindle 14 which can be connected to a steering wheel via a steering column, the rotary spindle is rotated via the steering engagement member 14e depending on the vehicle driver's steering wishes.

As a result of the connection of the steering spindle 14 to the steering spindle nut 16 via the recirculating ball system 14a, there is consequently produced an axial displacement movement or translational movement of the steering spindle nut 16 inside the housing 12.

As can further be seen in FIG. 1, the steering spindle nut 16 is itself in engagement with a segmented toothed wheel of a segmented shaft via a partial tooth arrangement at the covering face thereof.

In this regard, the axial displacement movement or translational movement of the steering spindle nut 16 is transmitted to the segmented toothed wheel, which results in a rotation of the segmented shaft.

The segmented shaft is again connected in a rotationally secure manner to a steering lever (not shown in FIG. 1) which is pivoted via the rotation of the segmented shaft and which transmits this pivoting movement to a steering mechanism which then pivots the wheels of a vehicle axle in accordance with the driver's wishes.

As a result of the tooth engagement between the steering spindle nut 16 and segmented toothed wheel, the steering spindle nut 16 is subjected for each translational movement to a radial force which it transmits to the steering spindle 14 via the recirculating ball system 14a.

Since the steering spindle 14 according to the present invention is pretensioned axially by a tensile tension, however, the steering spindle 14 is subjected to a smaller radial force or radial deformation of the steering spindle nut 16 so that the wear can be reduced according to the invention at the steering spindle 14, recirculating ball system 14*a* and steering spindle nut 16.

LIST OF REFERENCE NUMERALS

10 Recirculating ball steering gear
12 Housing
12*a* Guide hole
14 Steering spindle
14*a* Balls or recirculating ball system
14*b* Spindle groove
14*c* Region of first end of steering spindle
14*d* Region of second end of steering spindle
14*e* Steering engagement member
16 Steering spindle nut
16*a* Slotted nut
16*b* Partial tooth arrangement
18 Bearing device
18*a* First bearing unit
18*b* Second bearing unit
20 Pretensioning device
20*a* First pretensioning device
20*b* Second pretensioning device
The invention claimed is:

1. A recirculating ball steering gear for a steering system of a vehicle, comprising:
a housing;
a steering spindle;
a steering spindle nut which is guided in an axially displaceable manner inside the housing and which, in an assembled state, is connected to the steering spindle via a plurality of balls; and
at least one bearing device, by which the steering spindle is supported in the housing, wherein
the bearing device, the steering spindle, and the housing form an adjusted bearing arrangement, wherein
the bearing device has a pretensioning device, by which the steering spindle is pretensioned in an axially and/or radially adjustable manner, such that bending of the spindle under radial loads is reduced and contact uniformity of the balls is improved.

2. The recirculating ball steering gear as claimed in claim 1, wherein
the bearing device has at least a first bearing unit and at least a second bearing unit.

3. The recirculating ball steering gear as claimed in claim 2, wherein in the assembled state, the first bearing unit is arranged in a region of a first end of the steering spindle and the second bearing unit is arranged in a region of a second end of the steering spindle.

4. The recirculating ball steering gear as claimed in claim 3, wherein
the pretensioning device has at least a first pretensioning element which is arranged in the assembled state in the region of the first end of the steering spindle or in the region of the second end of the steering spindle.

5. The recirculating ball steering gear as claimed in claim 4, wherein
the pretensioning device has at least a second pretensioning element which is arranged in the assembled state in the region of the second end of the steering spindle, and
the first pretensioning element is arranged in the region of the first end of the steering spindle.

6. The recirculating ball steering gear as claimed in claim 2, wherein
the first bearing unit has at least a first tapered roller bearing and the second bearing unit has at least a second tapered roller bearing.

7. The recirculating ball steering gear as claimed in claim 6, wherein
the first tapered roller bearing and the second tapered roller bearing form, in the assembled state, an O-shaped arrangement.

8. The recirculating ball steering gear as claimed in claim 6, wherein
in the assembled state, the first pretensioning element is screwed on the steering spindle in the region of the first end of the steering spindle and is adjusted against at least one internal ring of the first tapered roller bearing.

9. The recirculating ball steering gear as claimed in claim 8, wherein
in the assembled state, the second pretensioning element is screwed on the steering spindle in the region of the second end of the steering spindle and is adjusted against at least one internal ring of the second tapered roller bearing.

10. The recirculating ball steering gear as claimed in claim 5, wherein
in the assembled and adjusted state of the first and second pretensioning elements, pretensioning of the steering spindle is at least in the form of a tensile pretensioning.

11. The recirculating ball steering gear as claimed in claim 5, wherein
the first pretensioning element is in the form of a slotted nut, and the second pretensioning element is in the form of a slotted nut.

* * * * *